Nov. 8, 1927.
R. E. HALL
1,648,224
PROCESS FOR RECOVERY OF SODIUM THIOCYANATE
Filed April 4, 1922
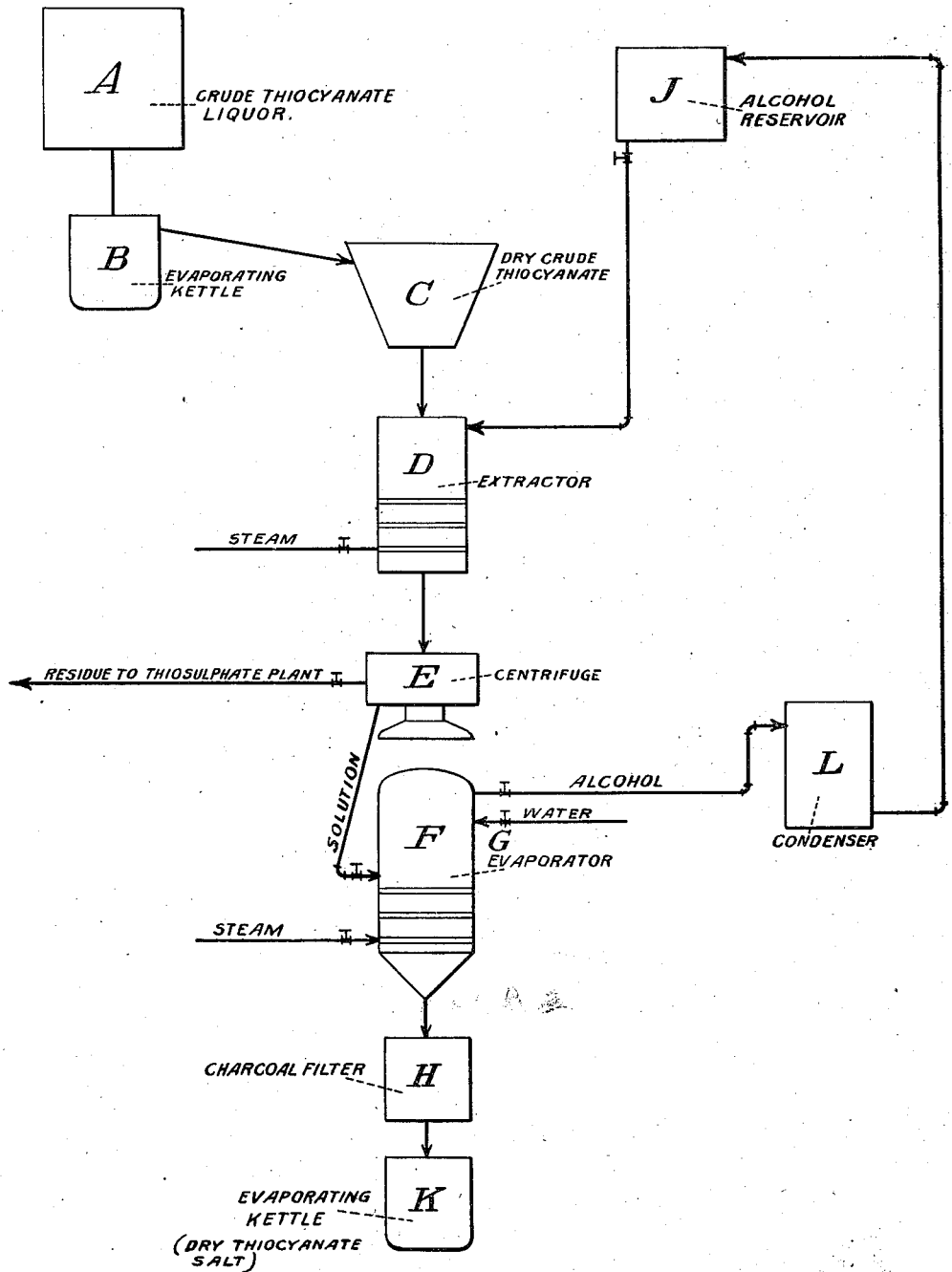
INVENTOR
Ralph E. Hall
by his attorneys Patented Nov. 8, 1927.

1,648,224

UNITED STATES PATENT OFFICE.

RALPH E. HALL, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PROCESS FOR RECOVERY OF SODIUM THIOCYANATE.

Application filed April 4, 1922. Serial No. 549,460.

This invention relates to the recovery of alkali metal thiocyanates from mother liquors obtained from gas purification. These mother liquors contain alkali metal thiocyanates, thiosulphates and carbonates, such as sodium thiocyanate, thiosulphate and carbonate, together with other impurities. These mother liquors are produced in processes of purifying gases, such as coke-oven gas containing hydrogen sulphide and hydrogen cyanide. As an example of such processes, see the patent of Jacobson, No. 1,390,037, of Sept. 6, 1921. These solutions are constituted principally of a mixture of the carbonates of sodium, of sodium thiosulphate, and of sodium thiocyanate. Sodium thiocyanate, in substantially pure form, is of commercial value, but when mixed with other alkaline salts of sodium, or sodium thiosulphate, loses a large part of its value.

By a process described in the co-pending application of myself and Jacobson, Serial No. 462,136, the sodium thiosulphate in these solutions is recovered in large part in pure form, and the other alkaline salts of the solution are in large part recovered in such form that they may be used again, for example, in further gas purification. The mother liquor remaining, however, still contains a small amount of the carbonates of sodium, a considerable quantity of sodium thiosulphate, and much sodium thiocyanate. By the present invention, the sodium thiocyanate is recovered in pure form, suitable for commercial purposes, and the thiosulphate is also recovered in such form that it may be made pure, suitable for commercial purposes, by recrystallization, or it may be added to the crude thiosulphate crystals obtained in the process of myself and Jacobson, and thus be recovered.

In the evaporation of the solution according to the process of myself and Jacobson for the recovery of thiosulphate, practically no thiocyanate separates at any stage of the operation because of its very great solubility in water. The relatively small amount of mother liquor left after the separation of the thiosulphate and the alkali metal carbonates, therefore, is very rich in thiocyanate.

Because of its great solubility, however, it is impracticable to obtain a pure thiocyanate by crystallization of this aqueous solution, as the thiosulphate remaining in the solution will contaminate the crystals, and the mother liquor left after the crystallization will still contain much of the thiocyanate, mixed with such highly colored impurities as have collected in the gas purification process. If water is not present, however, we may effect a complete separation of thiocyanate from thiosulphate, the alkali metal carbonates, any chance sulphates or ferro- or ferricyanides, and practically complete separation from any chlorides or nitrates. The thiocyanate is readily soluble in alcohol, while the thiosulphate, the alkali metal carbonates, sulphates, and ferro- or ferricyanides are insoluble, and chlorides and nitrates only slightly soluble in alcohol. I therefore evaporate the solution containing thiocyanate and thiosulphate and small amounts of other impurities to complete dryness to obtain a solid residue containing the thiocyanate contaminated with the other salts and impurities mentioned. The removal of the last parts of water requires an elevated temperature; 150° C. is sufficiently high to effect a satisfactory drying, if it is maintained a sufficient period of time. It is fully as satisfactory to heat to a higher temperature, upon which the mass becomes frothy, but finally melts to a smooth liquid. The temperature required for this lies between 200 and 300° C. After cooling, the mass is broken up, and treated with an organic solvent, such as alcohol, which dissolves the thiocyanates but does not dissolve the alkali metal sulphates or carbonates. For all practical purposes, the ordinary 95% ethyl alcohol, denatured or not, is quite satisfactory.

This alcohol, freed from the solid insoluble constituents by filtration, or other convenient means, contains the thiocyanate, and some part of the highly colored impurities present in the mother liquor; but practically no thiosulphate, alkali metal carbonate, etc. The next step is to separate the alcohol and the thiocyanate by evaporation. The alcohol is returned to the process to be used again for separation of the thiocyanate, and may, at periods require dehydration by refluxing over lime, or by any convenient means. The thiocyanate which separates, still contaminated by the colored impurities, is heated until thoroughly dry, is then dissolved to make a very concentrated solution, and is separated from solid material by filtration or other convenient means. Much of the colored impurity is removed by this step; the remainder by treating the concentrated solution with charcoal. A water white solution results, which upon evaporation to dryness yields a white salt of great purity. This salt is granular in form, if stirred occasionally during drying. To obtain a water free salt, it is necessary to dry at a temperature of 125 to 150° C.

The drawing shows schematically the preferred arrangement and sequence of steps of the process. As shown in the illustrated embodiment of the process, the crude thiocyanate liquor is fed from a storage tank A into a kettle B, where it is evaporated to complete dryness. From here it is removed to a hopper C, where it is fed into the extractor D. Alcohol from reservoir J is admitted to the extractor, and the contents are heated by steam coils. The insoluble residue and the alcohol containing the thiocyanate are led into the centrifuge E, where they are separated, the residue going to the thiosulphate plant for further recovery of the thiosulphate, and the solution going to the evaporator F. The alcohol is distilled from the solution, passing to the condenser L and thence to the reservoir J. When the salt is dry, the water cock G of the evaporator is opened, and sufficient water introduced to dissolve the salt. The resulting solution should be very concentrated, to keep out of solution as much colored impurity as possible. The solution is passed through charcoal filter H, goes thence to a kettle K, in which it is evaporated to dryness. When thoroughly dry, the salt is removed and placed in drums, to protect it from the moisture of the air, as it will absorb such moisture very readily.

While I have specifically described and diagrammatically illustrated the preferred steps and their sequence in carrying out my process, the invention is not limited to its preferred embodiment, but may be otherwise embodied within the scope of the following claims.

I claim:

1. The herein described process of recovering substantially pure alkali metal thiocyanate from mother liquors obtained from gas purification, comprising the steps of evaporating the liquor to dryness to obtain a residue containing the thiocyanate, extracting the alkali metal thiocyanate from the residue with a solvent which dissolves the thiocyanate and which does not dissolve alkali metal sulphates or carbonates, evaporating the solvent to obtain dry alkali metal thiocyanate salt, dissolving the salt in water, filtering the solution through charcoal, and evaporating to dryness.

2. The herein described process of recovering sodium thiocyanate from mother liquors obtained from gas purification, comprising the steps of evaporating the liquor to dryness to obtain a residue containing the sodium thiocyanate, extracting the sodium thiocyanate from the residue with alcohol, evaporating the alcohol to obtain dry sodium thiocyanate salt, dissolving the salt in water, filtering the solution through charcoal, and evaporating to dryness.

3. The herein described process of recovering substantially pure sodium thiocyanate from mother liquors obtained from gas purification, comprising the steps of evaporating the liquor to dryness to obtain a residue containing the sodium thiocyanate, extracting the sodium thiocyanate with alcohol, evaporating the alcohol to obtain dry sodium thiocyanate salt, dissolving the salt in a minimum quantity of water to obtain a substantially concentrated solution, filtering the solution through charcoal, and evaporating to dryness.

4. The herein described process of recovering alkali metal thiocyanate from mother liquors obtained from gas purification, comprising the steps of evaporating the liquor to dryness to obtain a residue containing the thiocyanate, extracting the thiocyanate from the residue with a solvent which dissolves the thiocyanate but which does not dissolve alkali metal sulphates or carbonates, evaporating the solvent to obtain the alkali metal thiocyanate salt, dissolving the salt into water, filtering the solution through charcoal, and evaporating to dryness.

5. In the process for recovering alkali metal thiocyanate from mother liquors obtained from gas purification, the steps which comprise evaporating the liquor to dryness to obtain a residue containing the thiocyanate, melting the residue, cooling the melted residue and extracting it with alcohol, and evaporating the alcohol to obtain the alkali metal thiocyanate salt.

6. In a process for recovering alkali metal thiocyanate from mother liquors obtained from gas purification, the steps which comprise evaporating the liquor to dryness to obtain a residue containing the thiocyanate, extracting the thiocyanate from the residue with a solvent which dissolves the thiocyanate but which does not dissolve alkali metal sulphates or carbonates, and evaporating the solvent to obtain the alkali metal thiocyanate salt.

7. In a process for recovering alkali metal thiocyanate from mother liquors obtained from gas purification, the steps which comprise evaporating the liquor to dryness to obtain a residue containing the thiocyanate and heating the residue to a temperature of at least about 150° C., extracting the thiocyanate with a solvent which dissolves the thiocyanate but which does not dissolve alkali metal sulphates or carbonates, and evaporating the solvent to obtain alkali metal thiocyanate salt.

In testimony whereof I have hereunto set my hand.

RALPH E. HALL.